United States Patent [19]

Ebcioglu et al.

[11] Patent Number: 5,721,854

[45] Date of Patent: Feb. 24, 1998

[54] METHOD AND APPARATUS FOR DYNAMIC CONVERSION OF COMPUTER INSTRUCTIONS

[75] Inventors: Mahmut Kemal Ebcioglu, Somers, N.Y.; Randall Dean Groves, Austin, Tex.

[73] Assignee: International Business Machines Corporation, Armonk, N.Y.

[21] Appl. No.: 703,804

[22] Filed: Aug. 27, 1996

Related U.S. Application Data

[63] Continuation of Ser. No. 390,267, Feb. 16, 1995, abandoned, which is a continuation of Ser. No. 146,547, Nov. 2, 1993, abandoned.

[51] Int. Cl.⁶ .................................................. G06F 9/45
[52] U.S. Cl. ........................ 395/379; 395/706; 395/391; 395/392
[58] Field of Search ........................ 395/379, 382, 395/384, 389, 390, 583, 733, 391, 392, 706

[56] References Cited

U.S. PATENT DOCUMENTS

| | | | |
|---|---|---|---|
| 4,295,193 | 10/1981 | Pomerene | 395/391 |
| 4,434,462 | 2/1984 | Guttag et al. | 395/598 |
| 4,437,149 | 3/1984 | Pomerene et al. | 395/389 |
| 4,450,519 | 5/1984 | Guttag et al. | 395/800 |
| 4,774,654 | 9/1988 | Pomerene | 395/449 |
| 4,833,599 | 5/1989 | Colwell et al. | 395/650 |
| 4,860,199 | 8/1989 | Langendorf et al. | 395/421.03 |
| 4,903,196 | 2/1990 | Pomerene | 395/393 |
| 4,916,652 | 4/1990 | Schwatz et al. | 364/748 |
| 4,920,477 | 4/1990 | Colwell et al. | 395/417 |
| 4,942,525 | 7/1990 | Shintami et al. | 395/393 |
| 4,943,908 | 7/1990 | Emma et al. | 395/587 |
| 5,051,885 | 9/1991 | Yates, Jr. et al. | 395/391 |
| 5,185,868 | 2/1993 | Tran | 395/393 |
| 5,248,628 | 9/1993 | Grobroski | 395/390 |
| 5,295,249 | 3/1994 | Blaner et al. | 395/389 |
| 5,303,356 | 4/1994 | Vassiliadis et al. | 395/585 |
| 5,442,760 | 8/1995 | Rustad et al. | 395/391 |
| 5,450,556 | 9/1995 | Slavenburg et al. | 395/582 |

OTHER PUBLICATIONS

Johnson, "Superscalar Microprocessor Design", Prentice-Hall, 1991, pp. 203–213.

Johnson, "Superscalar Microprocessor Design", Prentice-Hall 1991, pp. 233–235.

Johnson, "Superscalar Microprocessor Design", Prentice-Hall 1991, pp. 25–26.

"Hardware Support for Large Atomic Units in Dynamically Scheduled Machines", Stephen W. Melvin et al, IEEE, 1988, pp. 60–63.

IBM TDB, "Nonredundant Instruction Format for Interpretive Programming Languages", vol. 17, No. 8, Jan. 1975, pp. 2353–2354.

IBM TDB, "Threaded Code Interpreter for Object Code", vol. 28, No. 10, Mar. 1986, pp. 4238–4241.

IEEE 1992, "An Efficient Resource–Constrained Global Scheduling Technique for Superscalar and VLIW Processor", S. Moon and K. Ebcioglu, pp. 55–71.

(List continued on next page.)

Primary Examiner—Parshotam S. Lall
Assistant Examiner—Viet Vu
Attorney, Agent, or Firm—Wayne P. Bailey; Mark E. McBurney; Richard A. Henkler

[57] ABSTRACT

An instruction cache design which converts a sequential instruction stream into a compound format in the instruction cache. The conversion from sequential instructions to compound instructions is performed by an instruction stream interpreter unit (ISU), which is placed between the instruction cache and main memory. The conversion process is performed when an instruction cache miss occurs. Each line in the instruction cache contains a single compound instruction. The format of this compound instruction is transparent to programmers and will vary depending on the number of execution units which are to be supported.

2 Claims, 6 Drawing Sheets

OTHER PUBLICATIONS

*IEEE* 1986, "Experiments with HPS, a Restricted Data Flow Microarchitecture for High Performance Computers", Y. Patt et al, pp. 254–258.

*ACM* 1985, "Critical Issues Regarding HPS, a High Performance Microarchitecture", Y. Patt et al, pp. 109–116.

*Computer Society Press of the IEEE*, The 14th Annual International Symposium on Computer Architecture Jun. 2–5, 1987, "Branch Folding in the CRISP Microprocessor: Reducing Branch Delay to Zero", D. R. Ditzel et al, pp. 2–9.

*IBM Research Report*, RC 16145 (#71759) Oct. 2, 1990, Computer Science, "Some Global Compiler Optimizations and Architectural Features for Improving Performance of Superscalars", K. Ebcioglu et al pp. 1–13.

FIG. 1

```
42 ⌒⌣  Begin:
            Xt1 <-- Xop1(Xsa1, Xsb1)
            if Bop1(Bc1) goto Targ1
            Xt2 <-- Xop2(Xsa2, Xsb2)
            Ft1 <-- Fop1(Fsa1, Fsb1)
            if Bop2(Bc2) goto Targ2
            Ft2 <-- Fop2(Fsa2, Fsb2)
     Next1:
            . . .
     Targ1:
            Xt3 <-- Xop3(Xsa3, Xsb3)
     Next2:
            . . .
     Targ2:
            Ft3 <-- Fop3(Fsa3, Fsb3)
     Next3:
            . . .
```

Input: start_address, the address of the RISC instruction
beginning the group of RISC instructions to be converted.

Output: the VLIW tree instruction
for this group of RISC instructions initialize PATHS to ( ( )-start_address-open )

addr = start_address
do forever
    if contents of addr are not accessible then (close all paths, leave)
    instr = contents of addr
    extended=false
    for each open path p in PATHS which ends with addr do
       if there is an operation op in p on which instr is flow-dependent
          (i.e. op sets a register used by instr, or
          if op is a store and instr is a load)
          make path p closed
       else if the instr does not fit the resources,
          make path p closed
       else do
          extended=true
          if instr is a non branch operation
             add this instr to the path p,
             and make continuation(p) = addr+4
          else if instr is a conditional branch "if (not) cci goto L1"
             make a copy p' of p
             add "cci-F" ("cci-T") to p
             set continuation(p) = addr+4
             add "cci-T" ("cci-F") to p'
             set continuation(p') = target address L1 of conditional branch
             add p' to PATHS immediately after p
          else if instr is an unconditional branch "goto L1"
             set continuation(p) = target address L1 of branch
    end for
    if ¬ extended then do; close any open paths; leave; end;
    addr = addr+4
end do forever

FIG. 5

Input: the tree instruction in PATHS, start_address
Output: the long instruction word initialize all operations in the long instruction word
to NOP, all te_masks to 0,
all branch parcels to "disabled" pattern (all ones)

initialize the virtual_address field to start_address (address of the
RISC instruction starting the VLIW tree.)

for each path i in PATHS do (i=0,1,...,number_of_paths-1)
    initialize the cc mask for branch parcel i to all 0's
    initialize the next address field of branch parcel i to
      the continuation address for path no. i
    for each operation op in path i do
      if op is a non-test operation then
        if op was not already added to the VLIW word,
          reserve a slot for it and add it, with te_mask set to 0.
        set bit i of the te_mask of the ALU parcel containing op
      else /* if op is a test operation on a condition register */
        if test is cci-F then set the cci-F pattern in branch parcel i
        else if test is cci-T then set the cci-T pattern in branch parcel i
    end for
end for write the new VLIW word into the instruction cache location indexed by
start_address.

METHOD AND APPARATUS FOR DYNAMIC CONVERSION OF COMPUTER INSTRUCTIONS

This is a continuation of application Ser. No. 08/390,267 filed Feb. 16, 1995 now abandoned, which is a continuation of Ser. No. 08/146,547 filed Nov. 2, 1993, now abandoned.

TECHNICAL FIELD

This invention relates to an improved data processing system, and more particularly to an improved method and apparatus for executing sequential instructions on a data processing system having multiple processors or execution units.

BACKGROUND OF THE INVENTION

A great amount of attention is presently being paid to improving the performance of reduced instruction set computer (RISC) processors. The superscalar architecture is a recent name coined to uniprocessors that can achieve a peak execution rate of more than one instruction per cycle. Such architectures execute a standard sequential instruction set such as one normally executed by RISC uniprocessors, but are able to dispatch to their multiple functional units at a peak rate of two or more instructions in each cycle.

The number of parallel execution units which can be supported in a superscalar design is usually limited by the complexity of the dispatch logic, which must determine dynamically which instructions can be dispatched to the execution units during a given cycle. Very-long-instruction-word (VLIW) machines avoid this problem by having the compiler determine which instructions can be dispatched simultaneously (and hence can be executed in parallel by a plurality of execution units), and placing these instructions into one long instruction (hereinafter a compound, or VLIW, instruction). However, VLIW machines cannot maintain object code compatibility as the number of execution units are increased, since such increase changes the format of the compound instruction.

This loss of object code compatibility requires that programs that were compiled for uniprocessor, or sequential, execution must be re-compiled for use by a VLIW system having multiple execution units which function in parallel. There is a need to provide sequential instruction stream opcode compatibility on a VLIW machine that can execute a plurality of instructions in parallel.

Certain branch folding techniques, such as those of the CRISP microprocessor design, have been developed in order to execute a branch instruction together with a non-branch instruction. However, these techniques are not a general scheme for providing object code compatibility. Further, these techniques do not provide a general compound instruction, packed with multiple adjacent instructions and conditional branches, and having conditional execution and multi-way branching.

Certain scheduling techniques, such as those described by B. Ramakrishna Rau in a paper entitled "Dynamic Scheduling Techniques for VLIW Processors", (HPL-93-52, June 1993), allow for code generated for a high end model of a VLIW architecture to get executed on a low end model of the same VLIW architecture. The low end model has less functional units and/or different latencies for operations. This technique uses run-time dynamic scheduling depending on the number of functional units the current processor has. However, this technique does not provide object code compatibility between differing architectures. The technique further consumes valuable bandwidth, as the technique runs all the time, and not only when needed.

Another type of system that runs all the time, rather than only as required, is described in "Experiments with HPS, A Restricted Data Flow Microarchitecture for High Performance Computers", by Yale Pratt, Wen-mei Hwu, Stephen Melvin, et al., Proc. COMPCON 1986. These types of systems inherently require significant overhead, as there is no re-use of translated instructions.

SUMMARY OF THE INVENTION

This invention provides a unique instruction cache design which converts a sequential instruction stream into a compound format in the instruction cache. By doing so, the dispatch logic becomes almost identical to that of a traditional VLIW machine, and jet maintains object code compatibility since the same sequential instruction stream is used as input to the unique instruction cache.

The conversion from sequential instructions to compound instructions is performed by an instruction stream interpreter unit (ISU), which is placed between the instruction cache and main memory. The conversion process is performed when an instruction cache miss occurs. Today's cache designs typically provide for a 95–99% hit rate (or conversely, a 1–5% miss rate). Thus, the extra cycles required to perform the conversion after a cache miss should occur infrequently. Each line in the instruction cache contains a single compound instruction. The format of this compound instruction is transparent to programmers and will vary depending on the number of execution units which are to be supported.

It is therefore an object of the present invention to provide an improved data processing system.

It is yet another object of the present invention to provide sequential instruction compatibility with a VLIW execution unit/engine.

It is still another object of the present invention to provide an efficient procedure for mapping host instructions into target instructions.

It is yet a further object of the present invention to intercept an instruction stream during run-time, and convert the instruction stream to one that is compatible with the target machine.

It is still a further object of the present invention to minimize the complexity of control logic required to map dissimilar instruction sets.

It is yet another object of the present invention to minimize the complexity of control logic required to access sequential instructions and dispatch compound instructions.

These, and other, objects and advantages will now be further described in the detailed description of the preferred embodiment, together with the drawing, in which:

DETAILED DESCRIPTION OF THE PREFERRED EMBODIMENT

Figure 1:
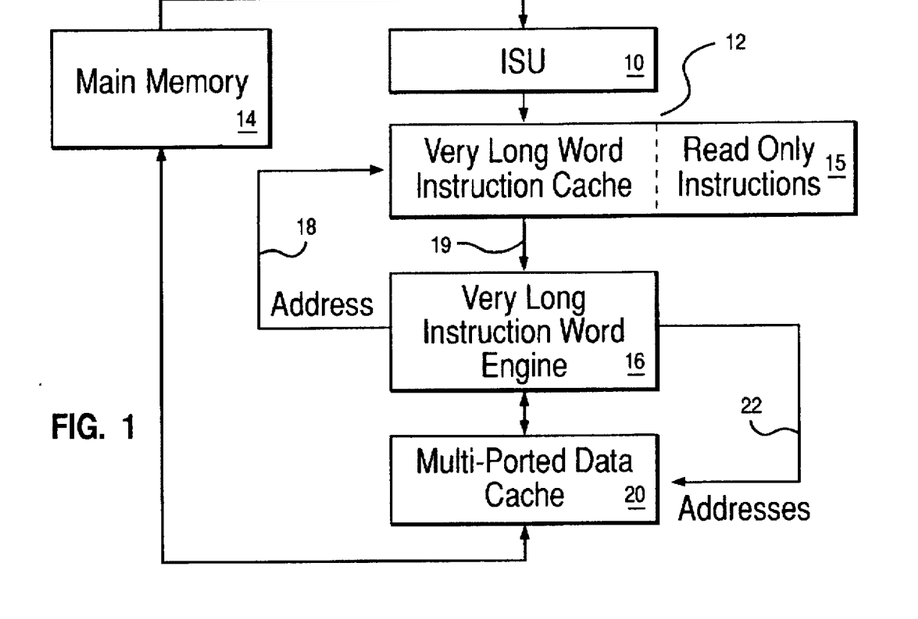
FIG. 1 shows the various components for converting sequential instructions into a compound format for execution by a VLIW engine.

Referring now to FIG. 1, there is an instruction stream interpreter unit (ISU) 10 between the instruction cache 12 and main memory 14. The instruction cache 12 supplies VLIW instructions to the VLIW engine 16. As will be further described below, the VLIW engine 16 provides addresses to the VLIW cache at 18. The VLIW engine 16 is coupled to a multi-ported data cache 20, and provides addresses to the data cache at 22, using common data cache techniques known in the art.

Figure 2:
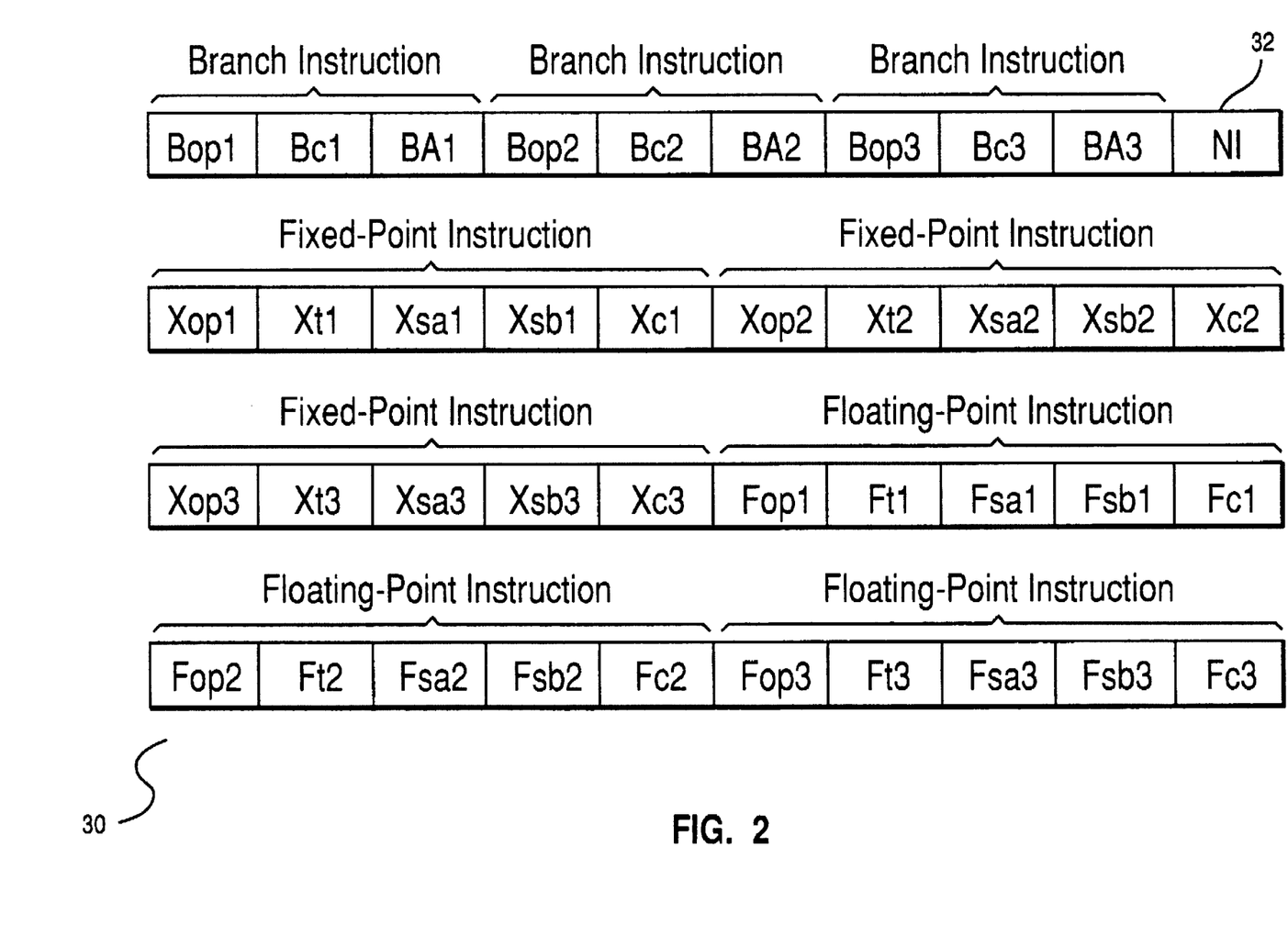
FIG. 2 shows the format of a VLIW instruction.

To illustrate the invention, a machine which will simultaneously support three branches, three fixed-point operations, and three floating-point operations will be described. To support this machine, the internal VLIW instruction format is shown at 30 in FIG. 2. For this embodiment, the fixed- and floating-point instructions are three-operand instructions of the form:

$$Xt \leftarrow Xop(Xsa, Xsb) \text{ or } Ft \leftarrow Fop(Fsa, Fsb)$$

where Xt and Ft are the target registers for the operations Xop (fixed-point) or Fop (floating-point), respectively; and Xsa, Xsb, Fsa, and Fsb are the source operands for the operations. The source operands can be either registers or immediate values.

Continuing with FIG. 2, the branch instructions are assumed to contain a branch operation, Bop, which indicates the type of branch to be performed, a branch condition test, Bc, which indicates the conditions which should be tested (if any), and the target address, BA, which indicates where to branch if the branch is taken. The BA can be a register, an absolute address, or can be program counter relative. The branch condition, Bc, in general indicates a set of condition code registers and the values they should have, in order for this branch to be taken (to support the full multiple path dispatch algorithm).

Given this instruction set, on a cache miss, the ISU examines each instruction as it is read from main memory. The ISU attempts to fill in the slots of the internal VLIW instruction 30 with the incoming sequential instructions from main memory. Instructions from main memory can be added to the VLIW instruction 30 if the following two conditions are met:

1. A VLIW instruction slot remains available which matches the class of the incoming instruction (e.g. only the first three fixed-point instructions can be accommodated since only three fixed-point slots exist).

2. An instruction does not have a true dependency on any of the instructions already placed into the VLIW instruction (e.g. an incoming instruction cannot be placed into the VLIW instruction if either of its source operands are the same as the target operand of an instruction already inserted into the VLIW instruction). This assumes that if two operations have the same target operands, only the logically later target value will actually appear in the register or memory upon the completion of execution. Since the ISU usually does not know the addresses of operands referenced in memory, memory operand dependencies are assumed to be handled in the data memory subsystem. Alternatively, a load can be conservatively assumed to have a true dependence on a store, unless the store and load have the same base address register and have displacements that differ by the operand length or more.

When a branch instruction is encountered, the ISU must take additional steps. Assuming that the branch instruction meets the previous two criteria, it is inserted into the VLIW instruction. To speed the resolution of the next instruction address, the ISU converts a program counter relative target address into an absolute address before placing it in the cache. If the branch is an unconditional branch, the ISU does not have to insert the branch into the VLIW instruction, but merely continues interpreting the instruction stream starting from the branch target address.

If the branch is a conditional branch, the ISU can proceed using one of two different algorithms. The first is called the trace algorithm. When using this algorithm, the ISU selects either the next sequential instruction or the branch target instruction as the next instruction to interpret, depending on which direction is the most likely to be taken. The ISU continues to interpret down only this trace until the interpretation is complete for this VLIW instruction.

A second algorithm for handling conditional branches is called the multiple path algorithm. When using this algorithm, the ISU will interpret down both the sequential and taken paths after the branch.

An ISU may implement both algorithms (trace and multiple path), selecting between the two based on knowledge about branch likelihood, the distance the branch target instruction is from the current instruction, or other heuristics that have been developed.

In either case, the ISU must flag all fixed- and floating-point instructions which are inserted into the VLIW instruction after a conditional branch to indicate which branch(es) they are dependent upon. These flags are put into the Xc and Fc fields in the VLIW instruction shown previously.

Conceptually, the VLIW instruction dan be viewed as a binary decision tree. The binary decision tree 40 of FIG. 4 corresponds to the sequential code stream shown in FIG. 3. The root and terminal nodes 42 of this tree 40 are the entry and exit addresses (or labels) for this VLIW instruction (the root node means the label at the top of the tree in FIG. 4, and the terminal nodes means the labels Next1 ... Next3 at the bottom of the tree). The non-terminal nodes 44 of tree 40 represent the conditional branch instructions. The two directed edges 46 from each non-terminal node represent the two possible instruction execution path which can be taken from the conditional branch. Fixed- and floating-point instructions are placed onto the directed edge for the instruction execution path which they existed on in the original sequential instruction stream.

Figure 4:
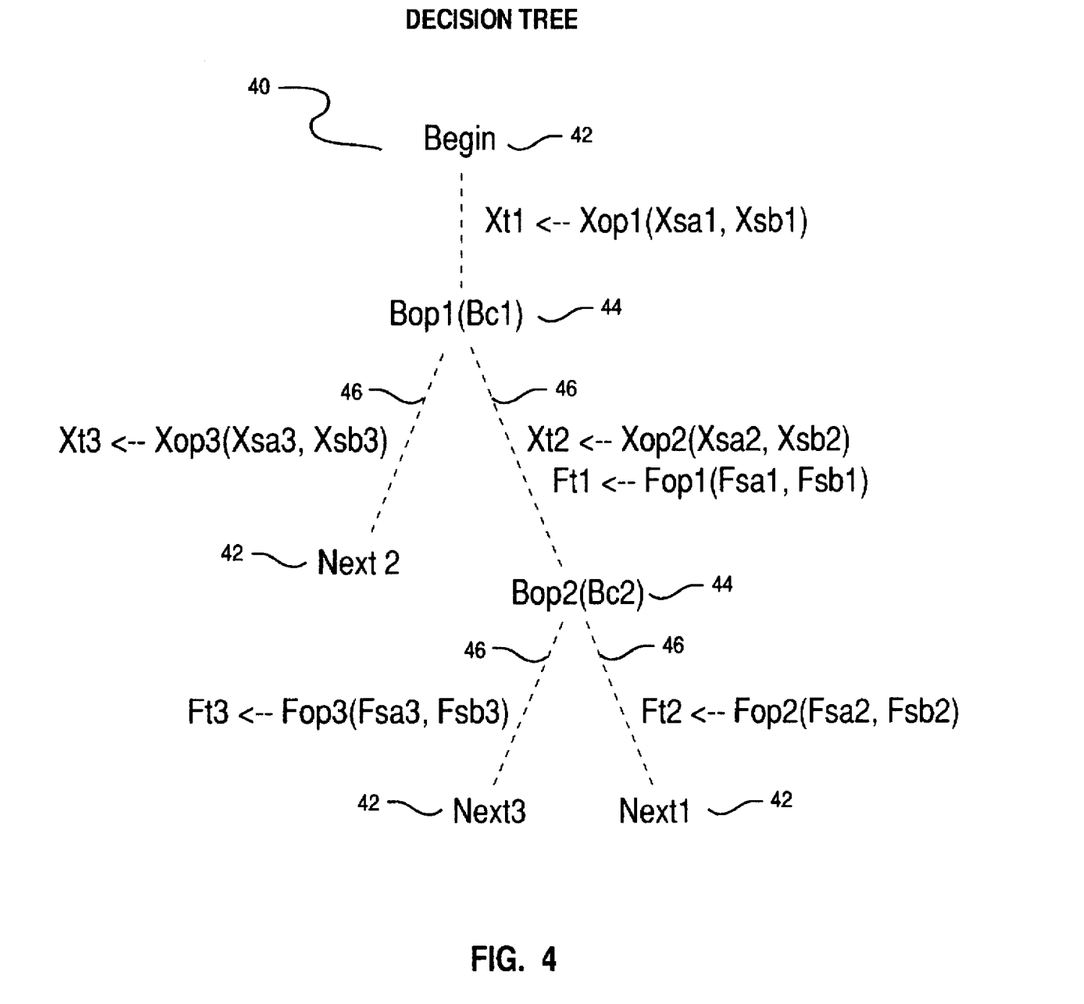
FIG. 4 shows a tree hierarchy of the sequential instruction stream of FIG. 3.

For the case shown in FIG. 4, three instruction execution paths are possible. They are:

1. Branch 1 is taken (resulting in a branch to Targ1 of FIG. 3). In this case, only Xop1 and Xop3 should really be executed. The next instruction is located at address Next2.

2. Branch 1 is not taken and Branch 2 is taken (resulting in a branch to Targ2 of FIG. 3). In this case, only Xop1, Xop2, Fop1, and Fop3 should really be executed. The next instruction is located at address Next3.

Figure 3:
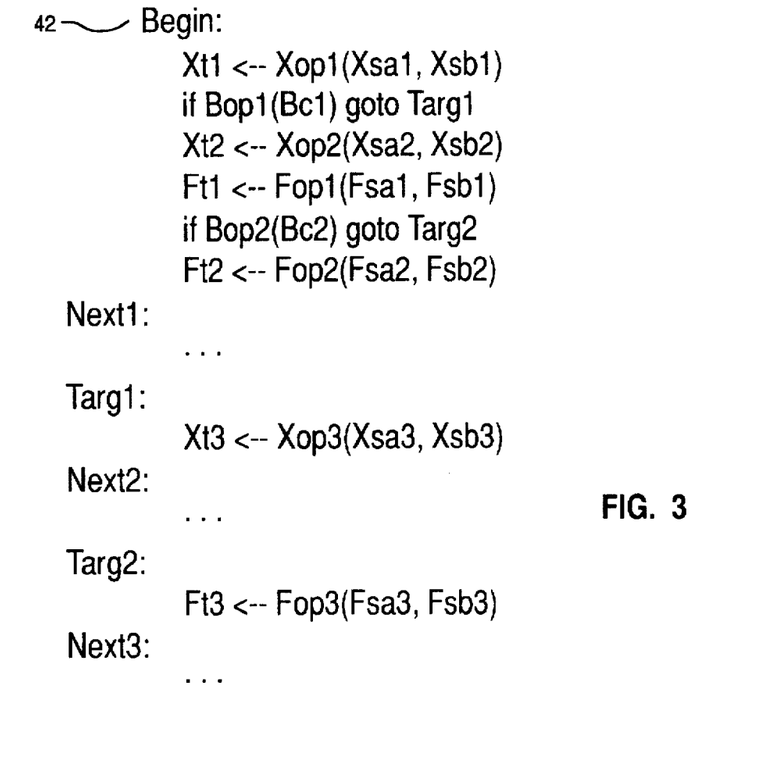
FIG. 3 shows a sample sequential instruction stream.

3. Branch 1 and 2 are both not taken. In this case, only Xop1, Xop2, Fop1, and Fop2 should really be executed. The next instruction is located at address Next1.

This execution information is encoded into the respective Xc and Fc fields in the VLIW instruction. The most straightforward encoding is to provide a bit for each terminal exit node in the tree (nodes Next1, Next2, and Next3 in the previous example). If the bit for that node is set to one, then that instruction was supposed to have been executed if this is the actual execution path. This scheme requires n+1 bits per non-branch instruction in the VLIW instruction to support n conditional branches. For the example given, if the Sc and Fc fields are encoded to indicated nodes Next1, Next2, and Next3 respectively, the fields for each of the instructions are as follows:

Xc1='111'b since it is executed on all paths

Xc2='101'b since it is executed on both the Next1 and Next3 paths

Xc3='010'b since it is executed on the Next2 path only

Fc1='101'b since it is executed on both the Next1 and Next3 paths

Fc2='100'b since it is executed on the Next1 path only

Fc3='001'b since it is executed on the Next3 path only

The branch processing unit is then responsible for not only selecting the proper next instruction address, but also broadcasting the exit node selection to all the other units so that they can cancel those instructions which should not have been executed on this path. Within a VLIW instruction, all operands are read before any operands are written. If multiple operations on the taken path of a tree set the same destination register or memory location, the rightmost slot (the operation closest to the terminal node of the tree) takes precedence and determines the final value of the destination register or memory location. A more detailed description of how VLIW branch processing works can be found in a paper by Ebcioglu, K. entitled "Some Design Ideas for a VLIW Architecture for Sequential Natured Software", Parallel Processing (proceedings of IFIP WG 10.3 Working Conference on Parallel Processing), pp 3–21, M. Cosnard et al. (editors), North Holland, 1988, and hereby incorporated by reference as background material.

Returning now to FIG. 2, when the ISU has completed filling a VLIW instruction 30, it places the address of the next instruction to be interpreted in the NI field 32 of the VLIW instruction. Usually this is the next sequential instruction, but, in the special case that the last instruction interpreted is an unconditional branch, the NI field will contain the target address of the branch.

The ISU can use two algorithms to determine when a VLIW instruction is complete. The simplest (associated with the trace dispatch method mentioned above) is to add only the sequential instructions on the predicted path to the VLIW instruction, and to consider the VLIW instruction complete when it encounters the first sequential instruction on the predicted path which cannot be placed into a VLIW slot, either due to the fact that all the slots for that class are full, or because a true dependency exists between an operation already in the VLIW and the sequential instruction.

A second algorithm (related to the multiple path dispatch method described above) is to follow instructions sequentially from the starting sequential instruction in main memory, tracking each of the paths from the start instruction separately, and forming a VLIW tree. Each sequential instruction is added to the open VLIW tree path(s) that it is a continuation of. A conditional branch causes two paths to be created from an existing tree path, one which continues at the target instruction and another which continues at the fall through instruction. A path of the VLIW tree is considered complete (closed) as soon as resources are exceeded or a true dependence is discovered on that path. The conversion algorithm terminates when all paths of the VLIW tree are closed, or when a RISC instruction which is not reachable from any of the open VLIW paths is encountered. Subsequently, the tree is converted into the binary VLIW instruction of the form depicted in FIG. 2. A more complicated algorithm is to continue interpreting the instruction stream for some predetermined sequence length, looking for other instructions which can be placed in a VLIW slot. With this approach, all the instructions which were "passed over" must be saved and inserted into the next VLIW instruction. In any case, if open slots remain in the VLIW instruction at the point that the ISU decides the instruction is complete, the ISU must insert no-operation instructions into the remaining open slots.

Figure 5:
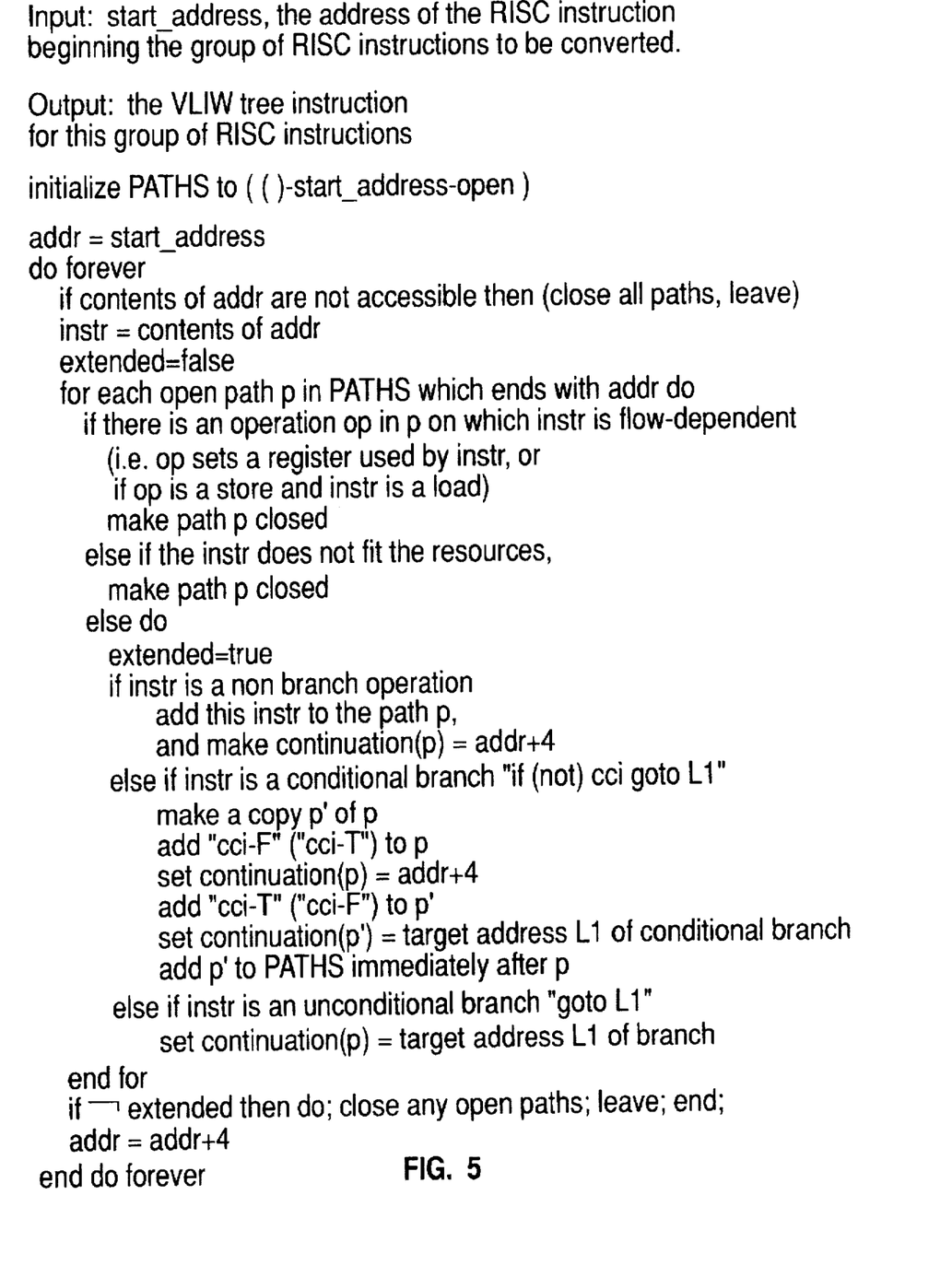
FIG. 5 is an algorithm for building a tree hierarchy from sequential RISC instructions.
Figure 6:
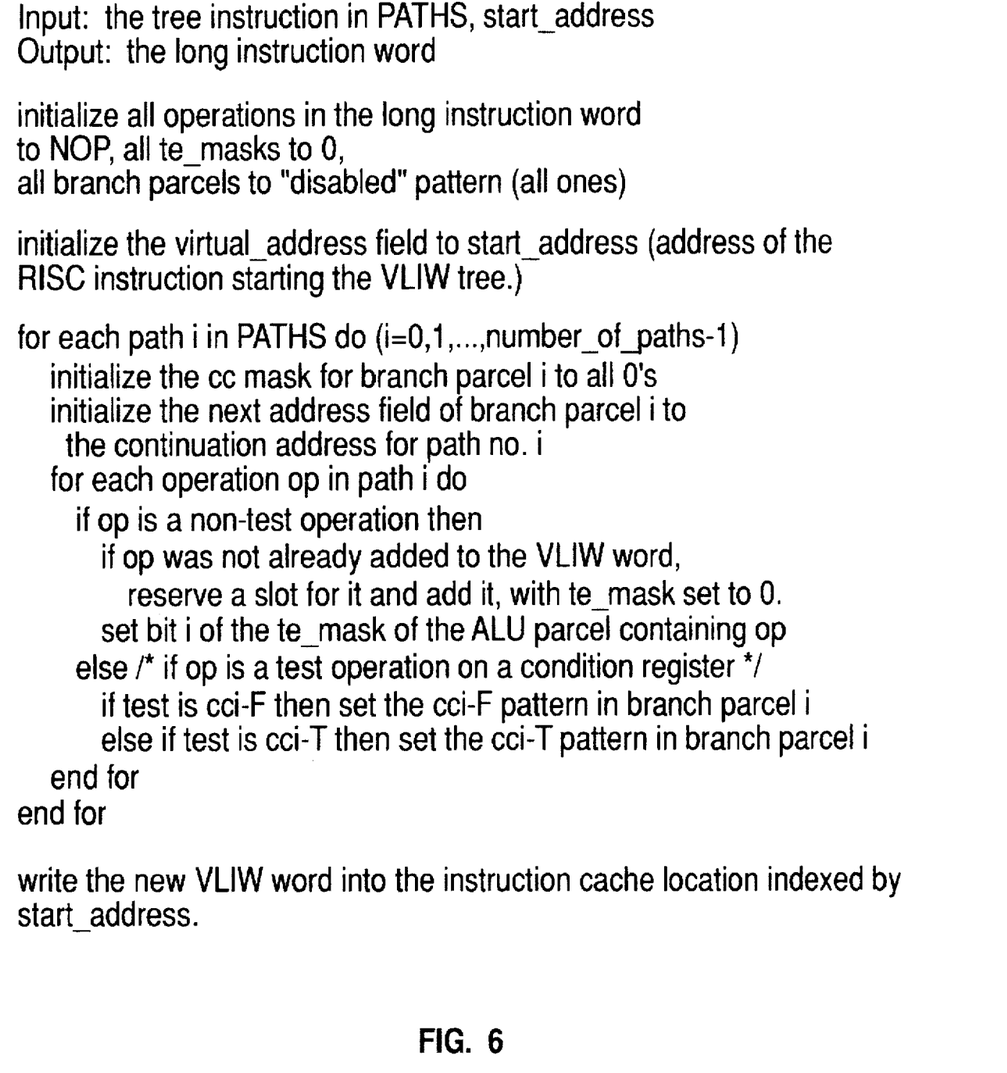
FIG. 6 is an algorithm for building VLIW instructions from a tree hierarchy.

FIGS. 5 and 6 provide a more detailed description of the "multiple path" conversion algorithm from sequential instructions to compound (VLIW) instructions. FIG. 5 shows an algorithm for converting sequential instructions into a tree. This algorithm deals with sequences of paths that represent the tree being built. The data structure is called PATHS. Each path in PATHS has the following components:

a sequence of operations;

the address of the instruction that is expected to continue the path;

a Boolean flag indicating if the path is open or closed. If a path is open, there is still the possibility of finding sequential instructions that will continue the path.

The algorithm shown in FIG. 5 describes, for example, a path that has operations op1 and op2 in it, ends at location 104, and that is still open, as a triple "(op1, op2)-104-open". A triple is a sequence of three items separated by dashes.

Next, the algorithm shown in FIG. 6 is used to assemble the compound, or VLIW, instruction from the tree built in FIG. 5. Each of the paths in PATHS is processed, and the new VLIW word is written into the instruction cache location indexed by the address of the first RISC (sequential) instruction in the group of RISC instructions corresponding to the VLIW word.

The above algorithms can be implemented in a variety of ways, ranging from a simple microcoded implementation that processes code in main memory instruction by instruction, to a mechanism using substantial hardware assist that fetches and multiple instructions at once.

In practice, to gain maximum benefit from the above described two techniques (trace and multiple path), a compiler should re-arrange sequential instructions and bring independent instructions together, using scheduling techniques known in the art, so that the instruction cache miss mechanism can create large groups of sequential instructions in parallel. However, the above described trace and multiple path techniques will work for existing code even when no scheduling techniques have been applied to the code. These scheduling techniques are described in a paper by K. Ebcioglu and R. Groves, entitled "Some Global Compiler Optimizations and Architectural Features for Improving Performance of Superscalers", Research Report No. RC16145, IBM T. J. Watson Research Center, Yorktown Heights, N.Y., 1990, presented at the ICCD-1990 conference, and a paper by S. M. Moon and K. Ebcioglu entitled "An Efficient Resource-Constrained Global Scheduling Technique for Superscalar and VLIW Processors", Proceeding MICRO-25, pp55–71, IEEE Press, December 1992, both hereby incorporated by reference as background material.

Given a VLIW instruction created by the ISU, the next problem is determining how to organize the instruction cache to be able to retrieve this instruction, while preserving the possibility that the original sequential code could branch into the "middle" of the VLIW instruction. This is further complicated by the fact that the instruction cache scheme should not have to restrict branch targets to be on large memory boundaries, like the VLIW instruction size, especially if this boundary restriction could change as more functional units are added.

Figure 7:
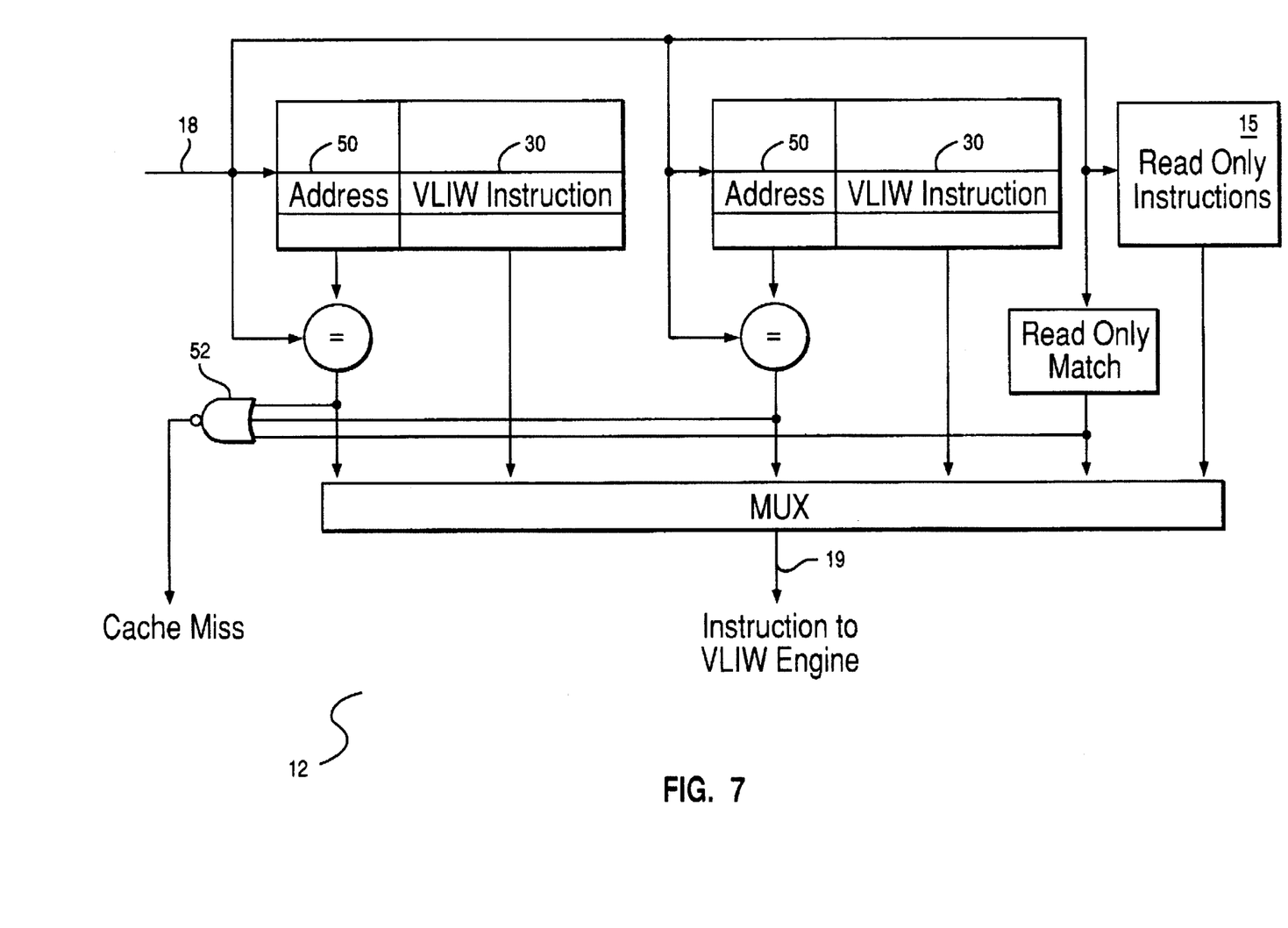
FIG. 7 shows the internal structure of an instruction cache.

The solution, as shown in FIG. 7, is to design an instruction cache 12 with a line size equal to the size of a VLIW instruction 30, and an associated directory entry 50 which contains the starting address of this sequence of instructions in the original code (i.e. the entry node 42 of decision tree 40). Ideally, this is a full-associative cache, such that when a target address is presented to the cache, the associated VLIW instruction 30 is produced if it exists in the cache. In many ways, this resembles branch target buffers, with the exceptions that multiple, independent instructions have been packed together, and sequential instructions as well as branch target instructions are contained in the cache.

If the target address does not exist in the cache directory, as determined at 52, a cache miss occurs and the ISU creates a new VLIW instruction associated with that address. Note that this scheme works even if the target address is in the "middle" of an existing VLIW instruction (e.g. a branch to Xop2 in the previous example). When this happens, a new VLIW instruction will be created by the ISU, containing some of the same instructions as the original VLIW instruction, but starting from a different entry node. In a fully-associative cache, both VLIW instructions could continue to exist and to be executed depending on which entry point is selected.

If a full-associative instruction cache is impractical for a particular design, a set-associative version is possible. The cache line and directory definition will remain the same; the issue is what to use as a hash to select the congruence class within each set. If you have a cache with a c congruence classes, a VLIW instruction with b branches and o other instructions, and an instruction address which is 1 bits long, the bits of the instruction address which should be used for hashing are bits $1-\log_2 c-[\log_2(b+o+1)]$ through $1-[\log_2(b+o+1)]-1$, numbering the bits left to right, with zero being the most significant bit. For the hypothetical machine with an instruction address of 30 bits and 64 congruence classes, the hash bits should be bits 20 through 25.

The function $[\log_2(b+o+1)]$ reserves as many low order bits of the instruction address as would be necessary to individually address each of the instructions in the VLIW instruction. If these low order bits of the instruction were used for hashing, then sequential VLIW instructions would not map to consecutive congruence classes in the cache, potentially wasting cache space, and causing more congruence class conflicts.

However, by excluding these low order bits from the hash function, entry nodes which are close to each other in the sequential code will all map to the same congruence class. In the hypothetical machine, worst case, all nine instructions within a VLIW instructions could be potential entry nodes under different execution paths resulting in nine different VLIW instructions mapping to the same congruence class. This kind of interference argues for a larger number of sets than would typically be required for an instruction cache.

To avoid the penalty of instruction cache miss processing, a second level (L2) instruction cache can be used in addition to the normal (L1) instruction cache. When the VLIW engine is not stalled because of an instruction cache miss (e.g. is executing a loop), the L2 cache can fetch groups of sequential instructions from the main memory and convert them to compound (long) instruction words. Then, when the desired compound instruction word is not found in the L1 cache, there is the possibility of finding it in the L2 cache. The above described conversions (from sequential to compound) can be done procedure by procedure in the L2 cache, without having to know what path the execution will take. For example, first the entry sequential instruction of a procedure can be converted to the tree hierarchy (and then to compound word). Then, the groups of instructions starting at the sequential instruction that were the continuations of this tree can be converted to compound words, and so on, until there are no unconverted instructions in the procedure, or until an unavailable page in instruction memory is encountered. Then, the procedures called from the current procedure can be similarly converted. A process id in the L2 cache, to tag the entries, can allow the conversion worked to be better saved across process switches.

For architectures such as the RISC System/6000 where the program binary image is mostly independent of the position it is loaded in, the ISU can save previous translations for substantial RISC program fragments in nonvolatile memory (hidden from the RISC architecture), along with the original RISC program fragments. When a RISC program fragment matches an existing, already translated RISC program fragment in nonvolatile memory (e.g. by a hash table lookup technique), the existing translation of this program fragment could be used.

One final issue is what to do about instructions within a VLIW instruction which interrupt or have an exception. Assume the model of the machine is precise interrupts.

When an exception occurs due to any parcel in the current tree instruction, the VLIW engine behaves as if the current tree instruction did not execute at all, and branches to a fixed interrupt location in a read-only portion 15 of the instruction cache 12. The VLIW exception code that resides in the read-only portion of the instruction cache can interpret RISC instructions sequentially, beginning with the RISC instruction that started the group of RISC instructions used to create the exception-causing VLIW instruction. The address of this RISC instruction is made available to the VLIW exception handler. This VLIW exception code can also set the architected registers of the RISC instruction set (such as the address of exception causing RISC instructions, or the data memory address which caused a page fault) properly, in order to emulate the target RISC architecture's exception behavior. These emulation techniques are known in the art, as described by U.S. Pat. No. 5,167,023 to de Nicolas et al, and hereby incorporated by reference as background material. After all RISC (i.e sequential) instructions in the VLIW instruction that caused the exception have been processed, the VLIW engine's execution continues by fetching the RISC instruction at the appropriate interrupt location of the target RISC architecture. If a corresponding longword for this RISC instruction is not available in the instruction cache, a cache miss occurs and a new long word is created as described above.

To avoid translating a program starting from random entry points after returning from interrupts (and thus filling the cache with entries that will be rarely used), one implementation is to stay in interpretive mode for a number of instructions after a "return from interrupt" RISC instruction, until the next backward branch (typically to the beginning of a loop), subroutine call, or return instruction is encountered. At such a point, an already translated instruction cache entry is likely to be encountered, if it is still in the instruction cache. If not, the ISU should create an instruction cache entry using one of the techniques previously described.

A final example of the above described techniques is now provided. Our invention takes a sequential instruction stream like that shown in Table 1, and converts this stream (i.e. the sequence starting at "L8:" and ending at "goto L8") into an efficiently encoded VLIW word for the tree shown in Table 2. The program in Table 1 implements a search algorithm for a particular data item in a linked list. Groups of independently executable sequential instructions in the program have already been brought together using compiler transformations known in the art. These groups have been delineated by dashed lines for clarity (but the ISU hardware discovers the compound group boundaries automatically). The notation in the following tables is such that the destination register appears to the left of the arrow; for example, "r3←r1+r2" means add r1 and r2 and put the result in r3.

TABLE 1

```
Loop:
load r8 <- 8(r8)        ;(1) r8=addr of 2nd
cc0 <- (r8==0)          ;(1) cc0= (2nd==NULL)
load r9 <- 4(r8)        ;(1) r9 = car(2nd)
load r8 <- 8(r8)        ;(2) r8 = cdr(2nd) = addr of 3rd
if cc0 goto endofchain  ;(1) if 2nd==NULL exit
load r10 <- 4(r9)       ;(1) r10 = car(car(2nd))
cc0 <- (r8==0)          ;(2) cc0 = (3rd == NULL)
load r9' <- 4(r8)       ;(2) r9'= car(3rd)
load r8 <- 8(r8)        ;(3) r8 = cdr(3rd) = addr of 4th
cc1 <- (r3==r10)        ;(1) cc1= (r3 == car(car(2nd)))
if cc0 goto endofchain' ;(2) if 3rd==NULL exit
load r10 <- 4(r9')      ;(2) r10 = car(car(3rd))
cc0 <- (r8==0)          ;(3) cc0 = (addr of 4th==NULL)
load r9" <- 4(r8)       ;(3) r9"= car(4th)
load r8 <- 8(r8)        ;(4) r8=cdr(4th)=addr of 5th
L8:
if cc1 goto found
cc1 <- (r3==r10)
if not cc0 goto L8.1
r9 <- r9'
goto endofchain'
L8.1:
r9 <- r9'               ;(2) (overhead) r9=car(n+3rd)
r9' <- r9"              ;(3) (overhead) r9'=car(n+4th)
load r10 <- 4(r9")      ;(3) r10=car(car(n+4th))
cc0 <- (r8==0)          ;(4) cc0=(addr of n+5th == NULL)
r9" <- 4(r8)            ;(4) r9"=car(n+5th)
load r8 <- 8(r8)        ;(5) r8=cdr(n+5th)
goto L8
```

TABLE 2

Table 2 shows the tree resulting from the sequential instruction stream of Table 1, using the previously described techniques. This involves an algorithm starting at "L8:" and processing instructions sequentially until "goto L8", to create a long word with the fields as shown in Tables 3 and 4. It further includes a mechanism for mapping a RISC instruction address to a VLIW instruction address, e.g., to find the VLIW word for "found" when given the address of the RISC instruction labeled "found".

Table 3 depicts three (3) branch slots/parcels in a VLIW word. Each branch parcel has a branch address (BA) field, and branch operation and condition (Bop+Bc) fields that are represented by a condition code (cc) register mask. For each different cc register of the machine, the cc mask of a branch slot indicates the value it should have (T=true, F=false, X=don't care) in order to take this branch. These values can be encoded with two bits for each cc register, as T=10, F=01, X=00.

TABLE 3

| (Bop+Bc) (cc masks) | | (BA) |
|---|---|---|
| cc1 | cc0 | (next address) |
| T | X | found |
| F | T | endofchain' |
| F | F | L8 |

Table 4 depicts an embodiment having seven (7) integer operation slots in a VLIW word. There is a bit mask associated with each slot (called te__mask, target execution or transfer enable mask) that indicates on which branches of the tree this operation should be executed. For example, the "cc1=(r3==r10)" operation is to be executed only when branching to the second and third paths of the tree, namely, to endofchain and L8.

TABLE 4

| operation | te__mask |
|---|---|
| cc1 <- r3==r10 | 011 |
| r9 <- r9' | 011 |
| r9' <- r9" | 001 |
| r10 <- load4(r9") | 001 |
| cc0 <- (r8==0) | 001 |
| r9" <- load 4(r8) | 001 |
| r8 <- load 8(r8) | 001 |

In summary, we have described a CPU which has an ISU between memory and a specially designed VLIW instruction cache. The complexity of a dynamic instruction dispatch mechanism is eliminated from a critical pipeline stage in a superscalar machine. This complexity has been put into the ISU, which only is activated on cache misses, instead of every cycle like the instruction dispatcher. The ISU also allows the preservation of object code compatibility with the original sequential instruction set while obtaining most of the advantages of a VLIW machine. This scheme can be extended to support as many execution units as the circuit, packaging, and compiler technology will allow.

While the invention has been shown and described with reference to particular embodiments thereof, it will be understood by those skilled in the art that the foregoing and other changes in form a d detail may be made therein without departing from the spirit and scope of the invention.

We claim:

1. A method of executing a computer program, compiled for sequential instruction execution, on a parallel instruction processing system, the method comprising the steps of:

retrieving, in response to a cache miss, a group of sequential instructions having a first and second conditional branch instruction, and first and second instructions that are dependent upon the first and second conditional branch instructions, respectively;

creating a compound instruction for parallel execution including the steps of:

inserting, for each of the first and second conditional branch instructions, a branch operation, and a branch address, into the compound instruction, the branch condition indicating the condition to be tested, and the branch address indicating where to proceed if the branch is executed;

inserting, for each of the first and second dependent instructions, a target register, a source operand, an operation indicator, and a dependency indicator, the operation indicator indicating the type of operation to be performed, the source operand indicating the register containing the data for the operation, the target register for containing the result of the operation, and the dependency indicator for indicating whether the execution of the instruction depends upon either the first or second conditional branch instruction; and storing the address of the next sequential instruction;

storing the compound instruction in the cache; and indexing the cache according to the address of the first sequential instruction in the compound instruction;

detecting an exception from the execution of one of the instructions in the compound instruction; and executing, in response to the exception, the instructions stored in the compound instruction sequentially.

2. An apparatus for executing a computer program, compiled for sequential instruction execution, on a parallel instruction processing system, the apparatus comprising:

means for retrieving, in response to a cache miss, a group of sequential instructions having a first and second conditional branch instruction, and first and second instructions that are dependent upon the first and second conditional branch instructions, respectively;

means for creating a compound instruction for parallel execution including:

means for inserting, for each of the first and second conditional branch instructions, a branch operation, and a branch address, into the compound instruction, the branch condition indicating the condition to be tested, and the branch address indicating where to proceed if the branch is executed;

means for inserting, for each of the first and second dependent instructions, a target register, a source operand, an operation indicator, and a dependency indicator, the operation indicator indicating the type of operation to be performed, the source operand indicating the register containing the data for the operation, the target register for containing the result of the operation, and the dependency indicator for indicating whether the execution of the instruction depends upon either the first or second conditional branch instruction; and means for storing the address of the next sequential instruction;

means for storing the compound instruction in the cache;

means for indexing the cache according to the address of the first sequential instruction in the compound instruction;

means for detecting an exception from the execution of one of the instructions in the compound instruction; and means for executing, in response to the exception, the instructions stored in the compound instruction sequentially.

* * * * *

UNITED STATES PATENT AND TRADEMARK OFFICE
CERTIFICATE OF CORRECTION

PATENT NO. : 5,721,854
DATED : Feb. 24, 1998
INVENTOR(S) : Mahmut Kemal Ebcioglu and Randall Dean Groves It is certified that error appears in the above-indentified patent and that said Letters Patent is hereby corrected as shown below:

Col. 4, line 33, delete "dan" insert --can--;

Col. 9, line 61, delete "L8y" insert --L8--.

Signed and Sealed this

Fourth Day of August, 1998

Attest:

BRUCE LEHMAN

Attesting Officer     Commissioner of Patents and Trademarks